United States Patent
Syed et al.

(10) Patent No.: US 11,671,482 B2
(45) Date of Patent: *Jun. 6, 2023

(54) MULTITENANT CROSS DIMENSIONAL CLOUD RESOURCE VISUALIZATION AND PLANNING

(71) Applicant: Corent Technology, Inc., Aliso Viejo, CA (US)

(72) Inventors: Shafiullah Syed, Saratoga, CA (US); Sethuraman Venkataraman, Chennai (IN); Edwin Luther Thumma, Chennai (IN); Sivakumar Chellappan, Chennai (IN)

(73) Assignee: Corent Technology, Inc., Aliso Viejo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/307,349

(22) Filed: May 4, 2021

(65) Prior Publication Data

US 2021/0258373 A1  Aug. 19, 2021

Related U.S. Application Data

(63) Continuation-in-part of application No. 16/420,672, filed on May 23, 2019, now Pat. No. 11,019,136.
(Continued)

(51) Int. Cl.
*H04L 67/1008* (2022.01)
*H04L 67/1031* (2022.01)
(Continued)

(52) U.S. Cl.
CPC ........ *H04L 67/1008* (2013.01); *G06F 9/5077* (2013.01); *H04L 67/101* (2013.01); *H04L 67/1023* (2013.01); *H04L 67/1031* (2013.01)

(58) Field of Classification Search
None
See application file for complete search history.

(56) References Cited

U.S. PATENT DOCUMENTS 8,326,876 B1 * 12/2012 Venkataraman ........ G06F 16/13
707/769
9,058,600 B1  6/2015 Havemose
(Continued)

FOREIGN PATENT DOCUMENTS

WO  2008042984  4/2008
WO  2014078227  5/2014

OTHER PUBLICATIONS

Williams, Emily. "5 Reasons Why Cloud Visualization Is Your Next Project," Hyperglance.com. 11 pages.
(Continued)

*Primary Examiner* — Backhean Tiv
(74) *Attorney, Agent, or Firm* — Fish IP Law, LLP

(57) ABSTRACT

A system for migrating a non-tenant-aware local application to a tenant-aware cloud application environment is disclosed to migrate individual modules of the application to instances of the cloud by grouping the modules via common characteristics in partition groups. By grouping modules together by partition group before migrating the modules to cloud instances, modules that share resources can be placed in closer logical proximity to one another in the cloud, modified, or deleted to optimize performance. The information from these modules is processed to create a visualization graph representing information on the cloud. The visualization graph is preferably multilayered so it can display information from different hierarchical layers of a cloud instance.

16 Claims, 5 Drawing Sheets

Related U.S. Application Data which is a continuation of application No. 14/815,801, filed on Jul. 31, 2015, now Pat. No. 10,320,893, which is a continuation of application No. 14/814,625, filed on Jul. 31, 2015, now Pat. No. 10,305,761.

(60) Provisional application No. 62/031,679, filed on Jul. 31, 2014, provisional application No. 62/031,712, filed on Jul. 31, 2014.

(51) Int. Cl.
    *H04L 67/101*      (2022.01)
    *H04L 67/1023*      (2022.01)
    *G06F 9/50*      (2006.01)

(56) References Cited

U.S. PATENT DOCUMENTS

| | | | |
|---|---|---|---|
| 10,305,761 B2* | 5/2019 | Syed | H04L 43/062 |
| 10,320,893 B2* | 6/2019 | Syed | H04L 67/1023 |
| 10,700,951 B2* | 6/2020 | Syed | H04L 43/062 |
| 11,019,136 B2* | 5/2021 | Syed | H04L 67/1008 |
| 11,196,548 B1* | 12/2021 | Buendgen | H04L 9/0822 |
| 2010/0005055 A1* | 1/2010 | An | G06F 16/256 |
| | | | 707/E17.001 |
| 2010/0005443 A1* | 1/2010 | Kwok | G06Q 10/10 |
| | | | 717/100 |
| 2011/0041066 A1* | 2/2011 | Kimmet | H04L 67/10 |
| | | | 715/736 |
| 2012/0173513 A1* | 7/2012 | Agrawal | H05K 999/99 |
| | | | 707/716 |
| 2012/0284408 A1 | 11/2012 | Dutta et al. | |
| 2012/0304179 A1* | 11/2012 | Devarakonda | G06Q 10/00 |
| | | | 718/102 |
| 2013/0268638 A1* | 10/2013 | Anderson | H04L 41/12 |
| | | | 709/220 |
| 2014/0067758 A1 | 3/2014 | Boldyrev | |
| 2014/0068075 A1* | 3/2014 | Bonilla | H04L 41/0823 |
| | | | 709/226 |
| 2014/0101226 A1* | 4/2014 | Khandekar | H04L 67/56 |
| | | | 709/203 |
| 2014/0164603 A1 | 6/2014 | Castel et al. | |
| 2015/0215376 A1* | 7/2015 | Kranz | H04N 21/4431 |
| | | | 709/226 |
| 2016/0036905 A1* | 2/2016 | Syed | G06F 9/5077 |
| | | | 709/226 |
| 2019/0334981 A1* | 10/2019 | Syed | H04L 67/1031 |
| 2020/0126275 A1 | 4/2020 | Moroze | |
| 2020/0126309 A1 | 4/2020 | Moroze | |
| 2021/0258373 A1* | 8/2021 | Syed | H04L 67/101 |

OTHER PUBLICATIONS

Hyperglance.com. "Build a Better Cloud With Hyperglance." 17 pages.

PRNewswire "Real Status Adds More Hyperglance Functionality and Pre-Integrated Data Sources to Provide the World's Most Extensible Hybrid Cloud Visualization and Control Software Solution." Nov. 20, 2014. 5 Pages.

* cited by examiner

MULTITENANT CROSS DIMENSIONAL CLOUD RESOURCE VISUALIZATION AND PLANNING

This application is a continuation-in-part of co-pending U.S. Non-Provisional application Ser. No. 16/420,672, filed May 23, 2019, which is a continuation of U.S. Pat. No. 10,320,893, filed Jul. 31, 2015, which is a continuation of U.S. Pat. No. 10,305,761, filed Jul. 31, 2015, which claims the benefit of priority to U.S. Provisional Application No. 62/031,712, filed Jul. 31, 2014. This application also claims the benefit of priority to U.S. Provisional Application No. 62/031,679, filed Jul. 31, 2014. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is software applications and services.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Computer environments have evolved from localized single user systems, to multi-user systems accessible by geographically distributed users. More recently, as cloud resources have become available, there has been a push to migrate one or more aspects (computer power, memory, storage, etc) of what were previously localized systems into the cloud. This can be done for many reasons, including efficient allocation of resources, cost-effective scalability, improved reliability, improved security, and greater accessibility.

There are numerous issues that arise in executing such migrations, including especially time and cost. For example, many applications are not well suited to a particular cloud environment because (a) cloud environments and their resources are available in a wide variety of configurations and may not pair well with the application's requirements, (b) legacy applications may fail to take advantage of the additional resources offered by a cloud environment and/or (c) applications run inefficiently in a cloud. Before migrating local software applications into a cloud environment, it is helpful to match and compare a local software application's hardware, software, network, and other application environment resources with the resources of any cloud environments considered for migration. The matching and comparing reveals compatibility, costs, and other software migration factors that can serve as a basis for the selection of a proper cloud environment or environments.

Thus, there is still a need for systems and methods that efficiently adapt legacy software applications so they may take advantage of the resources and benefits of a cloud environment, including migrating non-tenant aware software applications into applications that can be operated in tenant applications in a SaaS (Software as a Service) environment. One particular need is to effectively consider factors such as cost, scalability, performance, and security inherent in the use of cloud resources before the software application can be deployed on the cloud.

SUMMARY OF THE INVENTION

The inventive subject matter provides apparatus, systems, and methods in which application workloads are mapped to one or more cloud resources using a scanning engine, a partitioning engine, a mapping engine, and a rendering engine.

The scanning engine is preferably configured to identify characteristics of software applications and workloads associated with the applications, as well as identify characteristics of cloud environments and cloud resources available in the cloud environments. It is contemplated that one or more characteristics, applications, workloads, cloud environments, and cloud resources can be identified. The scanning engine is preferably configured to identify characteristics of the applications, workloads, cloud environments, and cloud resources to permit efficient, productive, and/or cost effective mapping of the workloads to the cloud resources.

The partitioning engine is preferably configured to use, at least in part, the information identified by the scanning engine regarding characteristics of the applications, workloads, cloud environments, and cloud resources in order to efficiently divide the workloads into executable groups and/or collections. It is further contemplated that the partitioning engine create as many permutations of workload arrangements as is reasonably possible or permitted by a set of rules. It is contemplated that the partitioned workloads be arranged based, at least in part, on information about the components of the application, the dependencies of the workloads, and the application environment context wherein the applications do or will operate.

The mapping engine in preferably configured to use, at least in part, the permutations of workload arrangements devised by the partitioning engine to create maps assigning each workload arrangement to an appropriately matched computer resource in the cloud. It is contemplated that the mapping engine creates as many permutations of maps as is reasonably possible or permitted by a set of rules. It is preferable that a match, and therefore potential assignment, of a workload to a computer resource be based on information provided by the partitioning engine regarding workload arrangements and by the scanning engine regarding the hardware, network, and software resources of the cloud environments and each cloud resource.

It is contemplated that the rendering engine be configured to present a visual representation of at least the workload partitions generated by the partitioning engine and/or the maps generated by the mapping engine. In a preferred embodiment, the rendering engine presents a representation of the optimal workload partition and the optimum map based on a set of human or machine provided rules.

Of particular interest are systems and methods that create a series of potential workload deployment options for dividing and assigning application workloads to all available cloud environments. Such a series of options permits users and/or cloud operators to evaluate and select optimal workload assignments as well as contingency plans in the event of maintenance, under performance, or outright failure of a deployed option.

Also contemplated are systems and methods that store the permutations of maps in a database for future reference or deployment of an alternative workload assignment map.

Also contemplated are systems and methods that rank desirability of the permutations of workload assignment maps by some user or administrator provided rules, such as cost, efficiency, and/or scalability.

Also contemplated are systems and methods wherein the surveyed application characteristics include software components, software dependencies, hardware dependencies, hardware characteristics, software characteristics, and network characteristics.

Also contemplated are systems and methods wherein the surveyed cloud environment characteristics include software components, software dependencies, hardware dependencies, hardware characteristics, software characteristics, and network characteristics.

Viewed from another perspective, the inventive subject matter provides apparatus, systems and methods that matches local application requirements with cloud resources, transforms any SaaS service deficient application into SaaS capable applications, and non-tenant aware applications into at least appearance of tenant-aware applications, maps the applications efficiently to the cloud resources, and monitors and meters users consumption of cloud resources and SaaS services.

In order to assess the compatibility, benefits, and other software migration factors for migrating one or more locally operated software applications to one or more cloud environments, it is helpful if the modules of each application are mapped onto appropriate cloud environment resources. In order to provide a comprehensive analysis, it can be advantageous to generate as many maps of the application modules as possible, and then apply each module map to the cloud environment resources in as many variations as possible. Once a full list of possible configurations to map the application modules to the cloud environment has been generated, the user can select the most desirable configuration based time, speed, power, cost, or other performance factors.

Once a cloud environment or multiple environments have been selected for a single or multiple local software applications, each software application is preferably transformed to operate in each home cloud environment to facilitate the application (a) running efficiently in the cloud environment, and/or (b) taking advantage of additional resources offered by a cloud environment. Software applications can be individually re-written to resolve those issues, but it is often desirable to provide an automated process for transforming existing software applications (which might be locally based) to operate efficiently in a cloud environment. An automated process for transforming a locally operated software application into a cloud operated software application reduces the delay and cost required to migrate a local application into the cloud.

Once one or more locally operated applications have been migrated into the cloud and configured to operate in the cloud environment, most or even all operations or workloads engaged by the application will likely be performed by the cloud environment resources. In order to efficiently utilize cloud resources, it is helpful to first divide the application's workloads into related groups or partitions, and then assign each partition to a cloud resource. The assignment of partitions to cloud resources can be based on time, speed, power, cost, or other performance factors, that are most desirable for the user.

The inventive subject matter further provides apparatus, systems, and methods in which an interface module scans the SaaS application to identify the different components and workloads of the software and analyzes its dependencies within the software and also on the environment in which the application is expected to run. Such an analysis may find information regarding application servers, databases, operating systems, hardware configuration, external software, and hardware interfaces.

In one embodiment, an interface module analyzes the SaaS application, identifies the workloads that constitute the software, separates them into partitions and maps them onto appropriate cloud resources.

Once one or more software applications are available for operation in one or more cloud environments, it is desirable to measure and/or meter each user's use of any applications, and each application's use of cloud resources. This metering can be used to charge individual users and/or groups of users for the cost of cloud resources actually consumed by the users rather than based on storage limits, time limits, processor limits, or other forms of block billing. This metering can also be used to charge individual users of the same application separately, based on the user's actual use rather than block billing. This is beneficial because it allows cost sensitive users greater control over the cost of cloud based applications, and allows cloud operators to more efficiently assign and bill for available resources.

The multi-tenant framework of the system enables multiple customers to use the software system. Each customer can allow multiple users to gain access to the system. Each user can create multiple accounts, and each account is linked to a cloud instance, which can be public, private or hybrid. The software system using the account information connects to the cloud, preferably receives information about the cloud resources pertaining to this account, and saves this data for future reference. This information is processed to create visualization graph, or visual rendering, of the information on the cloud about this account. The visualization graph is preferably multilayered so it can display information from different hierarchical layers of the cloud instance. These layers can be related to infrastructure (both connected and unconnected), cloud resource groups and their associated hierarchy, software applications and their sub-components denoted as workloads, and higher forms of software systems. Advantageously, the software system can begin with a 3D rendering of this information, and over time add additional dimensions, including those of time, types of resources, attributes, connections, and any other relevant information.

In interpreting descriptions in this Specification, groupings of alternative elements or embodiments of the inventive subject matter are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
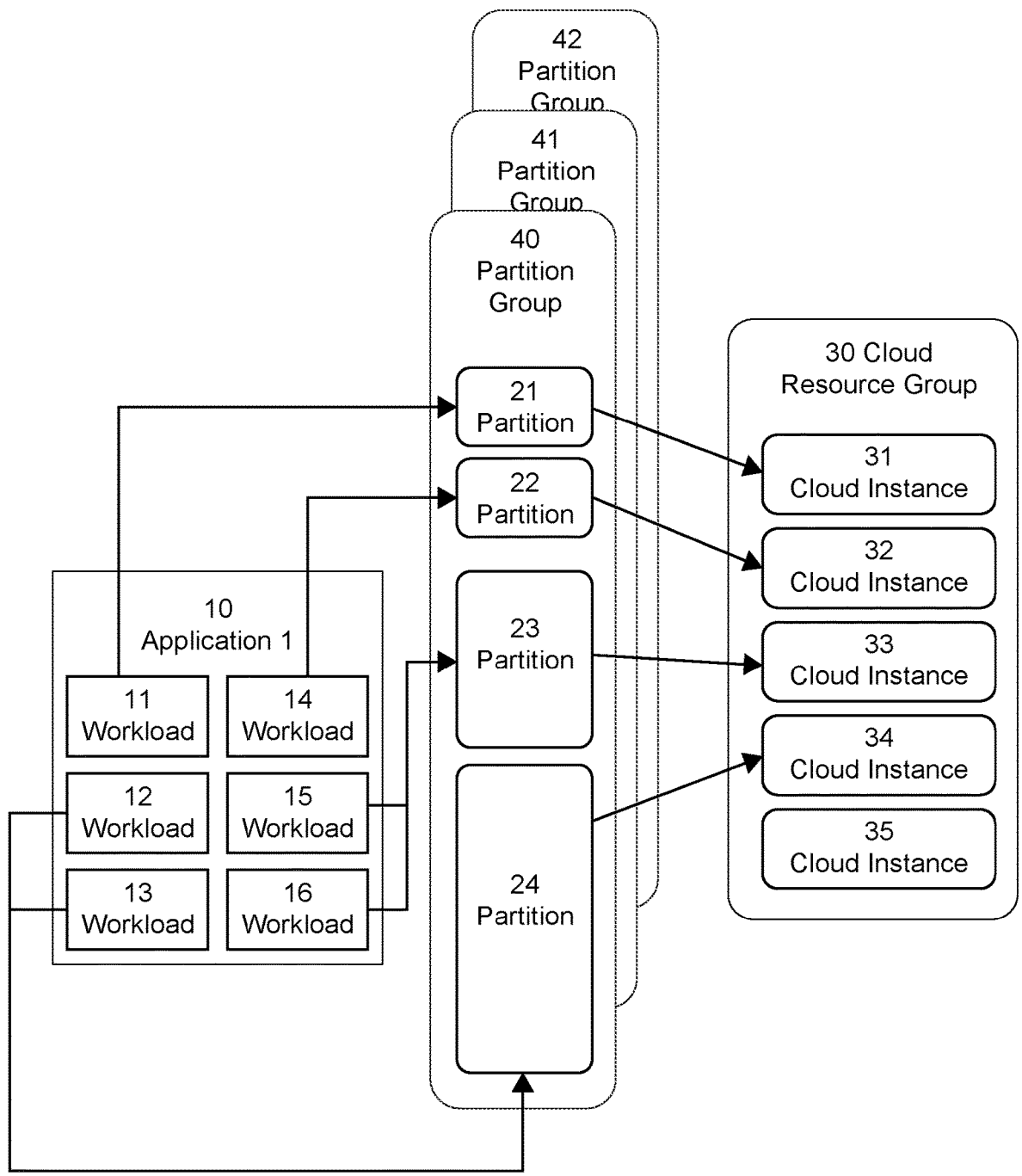
FIG. 1 is a schematic illustrating how an application is analyzed, partitioned in to manageable segments and packed on to cloud resources such as virtual machines or virtual instances.

The following description includes information that may be useful in understanding the present invention. It is not an admission that any of the information provided herein is prior art or relevant to the presently claimed invention, or that any publication specifically or implicitly referenced is prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

It should be noted that any language directed to a computer or a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

Regarding transformation of a non-tenant aware application to an application that operates with multiple tenants, one could modify the application according to teachings of WO2008042984 (Hofhansl) and US20100005055 (An), or modify the application environment context according to teachings of U.S. Pat. No. 8,326,876 (Venkatraman) or US2010/0005443 (Kwok). Co-owned U.S. Pat. No. 8,326, 876 (Venkataraman) also discloses multi-tenant agile database connectors that could be used to transform a locally-based application into a multi-tenant application system.

These and all other publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

FIG. 1 is a schematic illustrating how an application 10 could be analyzed, partitioned in to manageable segments and packed on to cloud resources such as virtual machines or virtual instances by a system of the current invention.

Reference 10 represents a typical non-tenant aware application or a tenant-aware SaaS application that comprises individual computer units constituting one or more workloads. As used herein, a "workload" can be one or more modules of a software application or a SaaS application that can be independently executed separately from other modules of the software application on any computer unit of a cloud. The application represented by 10 has workloads 11, 12, 13, 14, 15 and 16; all of which belong to the same application, although an application having any number of workloads could be migrated by the system without departing from the current invention.

The system generally establishes one or more partition groups, as shown as partition group 40, to group one or more workloads together into one or more partitions based on one or more module characteristics and/or dependencies with other modules. Such partition groups could be automatically selected by the system based upon any suitable heuristic, for example all modules saved on the same computer system could be grouped together, or all modules that share a particular dynamic linked library could be grouped together. In some embodiments, an administrator user could group the modules together manually via a user interface, but preferably the system automatically groups modules together in accordance with one or more rules. In the present example, workload 11 is mapped to partition 21; workload 14 is mapped to partition 22; two workloads 12 and 13 are mapped to partition 24; and workloads 15 and 16 are mapped to partition 23.

As shown here, all modules of application 10 could be mapped into a partition group 40 which, consists of one or more partitions 21, 22, 23 and 24. An application can be represented by multiple partition groups such as 40, 41, 42, which defines multiple methods of partitioning the same application. Partitions belonging to a single partition group can be mapped to a single cloud Instances or to multiple cloud instances.

A group of cloud resources called cloud resource group 30, allocated for the application, contains multiple cloud instances 31, 32, 33, 34 and 35. Partition 24 could be mapped to cloud instances 34, 23 to 33, 22 to 32 and 21 to 31. It's possible to map more than one partition to a single cloud instance. It is possible to establish multiple cloud resource groups so that these different cloud resource groups can be mapped to the same cloud or to different clouds for application deployment. As used herein, a "cloud instance" is a logical instantiation in a cloud environment of a plurality of cloud resources logically grouped together by the system to ensure that all workloads in the selected partition share the same cloud resources, such as hardware, software, and/or network resources.

Figure 2:
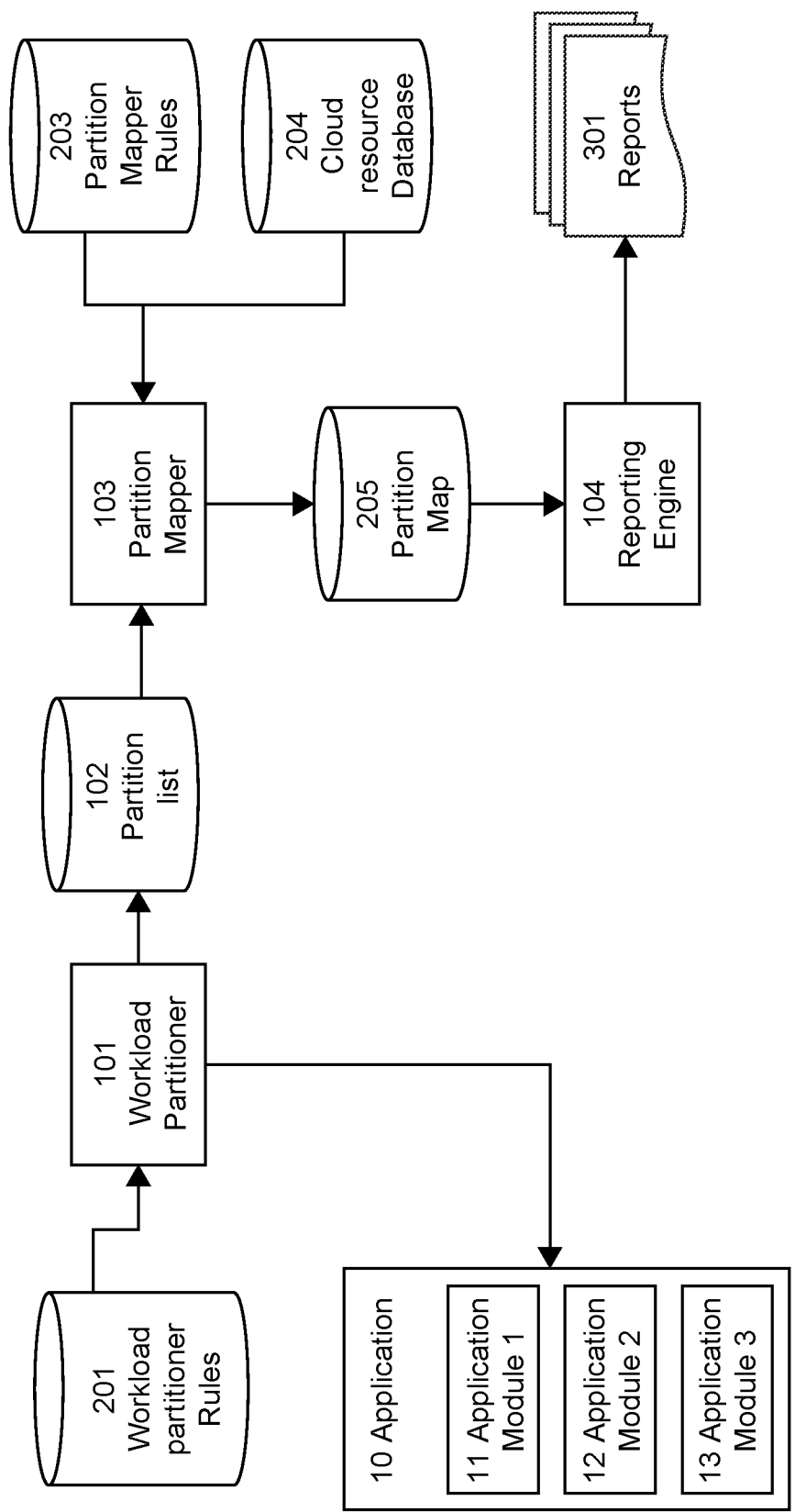
FIG. 2 is a schematic depicting a workload planner, which comprises a partitioner and a packer along with the different interface modules and storage units participating in the process of planning workloads for effective deployment on cloud resources.

FIG. 2 is a schematic depicting a workload planner computer system architecture.

The workload planner comprises of 2 interface modules workload partitioner 101 and partition mapper 103. Workload partitioner analyzes application 10 to determine which modules/workloads are in application 10. Here, Workload partitioner has discovered that application 10 has one or more workloads, or modules, shown as modules 11, 12 and 13.

The workload partitioner 101 analyzes the application workloads and based on the rules specified in workload partitioner rules database 201 (typically defined by an administrator user via an administrator user interface), and partitions these workloads into multiple partitions. The partitions representing a single application 10, which is aggregated into a single partition group and stored in partition list database 102. The workload partitioner 101 can be invoked multiple times to create more than one partition group to represent a single application. Each partition group represents a different logical grouping that could be used to group workloads together in accordance with one or more common characteristics between the workloads. These multiple partitions of the application are stored as a list of partitions in the database 102.

Partition mapper 103 reads the partition list(s) created by workload practitioner 101, references the available resources saved on cloud resource database 204 (typically created by a cloud analyzer module, not shown, that analyzes a cloud and determines what resources are available on the cloud), and creates cloud mapping patterns based on partition mapper rules 203 and the various created partitions in partition list database 102. The mapped partitions of the application 10 are then stored in the partition map database 205. Multiple partition maps can be created for the same application and stored in the partition map database 205. As used herein, a "partition map" is a migration plan that could be used to migrate each of the workloads to the mapped set of cloud resources in accordance with the created partition group(s). Such a migration plan could be transmitted to a system that migrates applications to various cloud-based systems, such as the tenant-aware cloud-based systems disclosed in co-pending U.S. Pat. No. 8,326,876 (Venkataraman), to assist in properly deploying an application to keep workloads having common characteristics in logical groupings in the cloud. By keeping such workloads together, the functionality of the application within the cloud infrastructure could be increased, while still taking advantage of the distributed nature of cloud-based infrastructures.

A reporting engine 104 could be used to create reports 301 on workloads mapped to partition maps of cloud resources. The partition list can be read by other utilities and tools to provision, deploy and manage cloud resources. Reporting engine 104 typically renders the migration plan into a manner that could be presented by a user interface, such as a visual map on a display screen or a printer.

Figure 3:
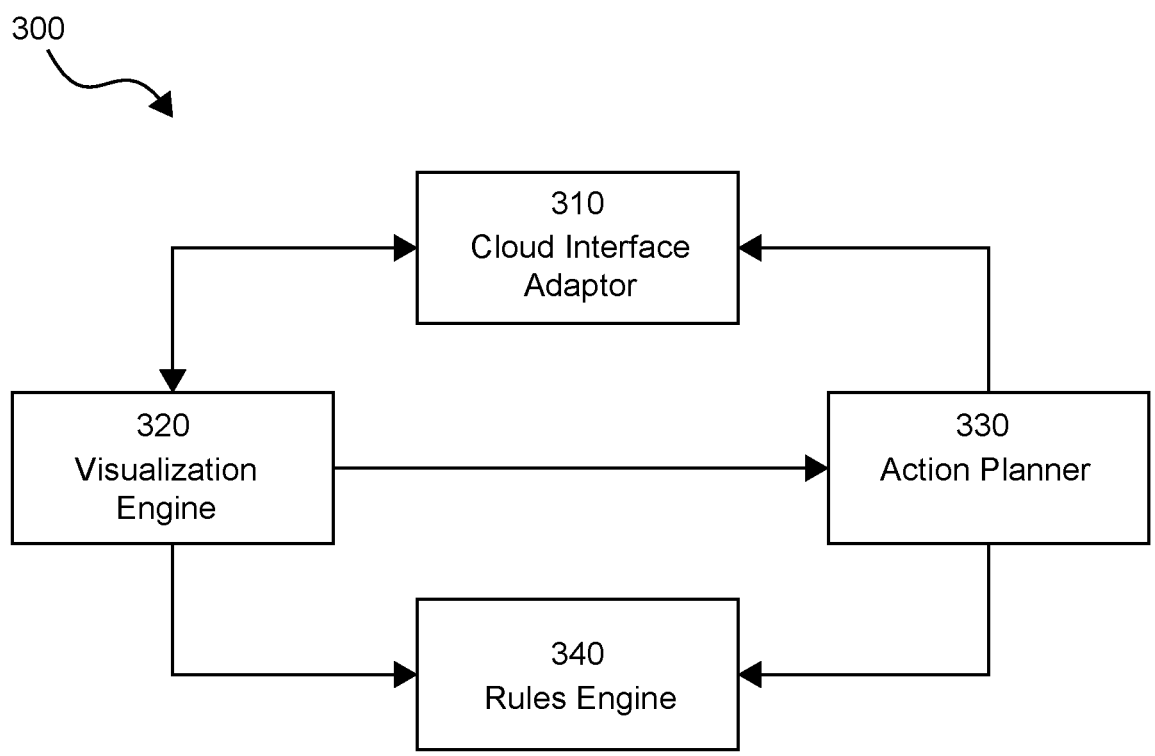
FIG. 3 is a schematic depicting multi-dimension visualization and action planning software for cloud resources.

FIG. 3 is a schematic depicting multi-dimension visualization and action planning software for cloud resources.

Cloud Software 300 represents a cloud visualization and action planning application that comprises individual computer units constituting one or more workloads. Cloud Interface Adaptor 310 interfaces with one or more cloud instances to retrieve information on customer's cloud accounts, and cloud metadata. Cloud metadata can include cloud instance operating information, cloud instance attributes, and interdependent cloud instance connection data. Interdependent cloud connection data can include data between cloud instances, between partitions, or between workloads. Visualization Engine 320 enables users to view their cloud resources on the cloud. In a preferred embodiment, the visualization of the cloud resources is generated with 3D objects. In a related embodiment, the visualization of the cloud resources includes information on cloud metadata in order to create a visual experience via the user navigating through a 3-dimensional space.

Action Planner module 330 facilitates action grouping, action validation and action execution on the cloud. In a preferred embodiment, module 330 can set parameters to govern the mapping and/or assignment of cloud instance actions into groups. The parameters for grouping, or validation, can be based on efficient use of cloud resources, low cost operation of the application, heightened performance of the cloud instance, or other user desired results. In one embodiment of the inventive subject matter, cloud instance actions are grouped based on action characteristics and relations between and among various actions and aspects of the cloud instance environment. In a related embodiment, the actions of a single cloud instance can be mapped and/or assigned to multiple groups of cloud instances, representing as many or as few action grouping permutations as is possible or desired by the user. Rules Engine 340 interfaces between Visualization Engine 320 and Action Planner module 330 to manage context-based rules.

Figure 4:
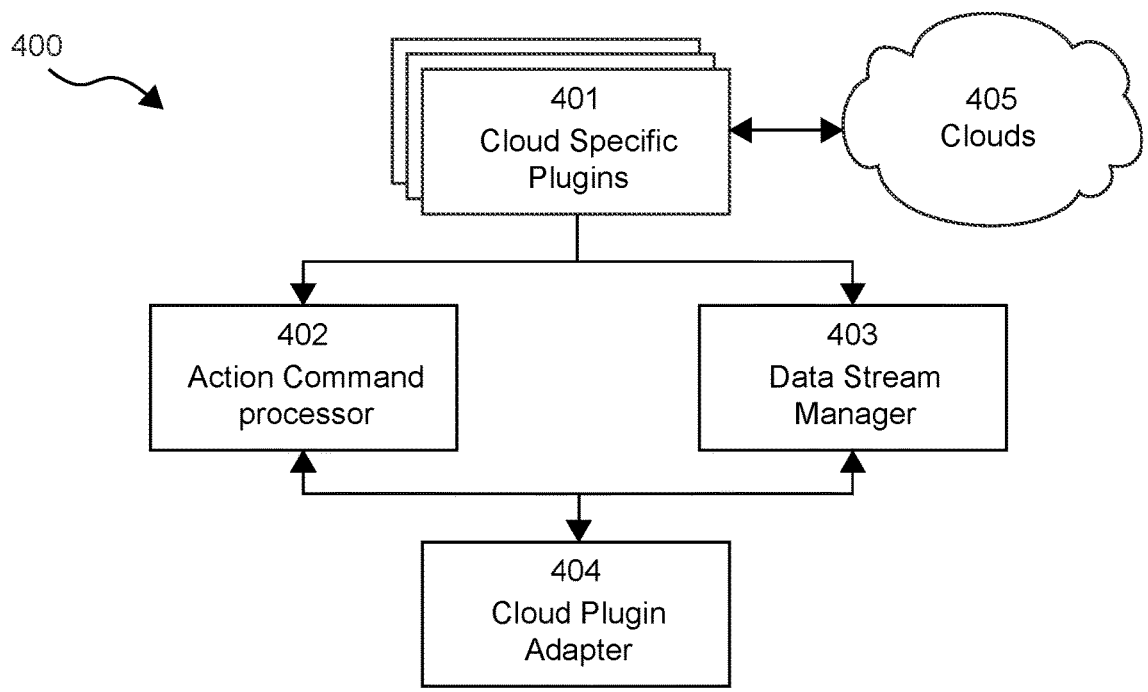
FIG. 4 is a schematic depicting a Cloud Interface Adaptor 400 used to communicate with different clouds, and usage of data for visualization and action planning.

FIG. 4 is a schematic depicting a Cloud Interface Adaptor 400 used to communicate with different clouds, and usage of data for visualization and action planning.

In a preferred embodiment, Cloud Module 405 comprises one or more cloud instances. A cloud instance can be public, private or a hybrid cloud instance. Module 401 comprises Cloud Specific plugin software that connects with each cloud instance. In exemplary embodiments, the Cloud Specific plugin software includes cloud instance-specific knowledge on cloud instance connection protocol and retrieval of information from the cloud instance. Module 404 is a Cloud Plugin Adapter that interfaces with Visualization Engine 320 and Planning Engine 330. The Cloud Plugin Adapter of Module 404 utilizes Action Command Processor 402 to process command requests from other cloud instances. In a preferred embodiment, Action Command Processor 402 will receive a command to connect cloud instances, and can route the relevant Cloud Specific plugin software of Module 401 to interface with its corresponding cloud instance in order to facilitate a connection between cloud instances. In related embodiments, Module 404 also uses Data Stream Manager 403 to receive information streams from different clouds through the cloud specific adapters of Module 404.

Figure 5:
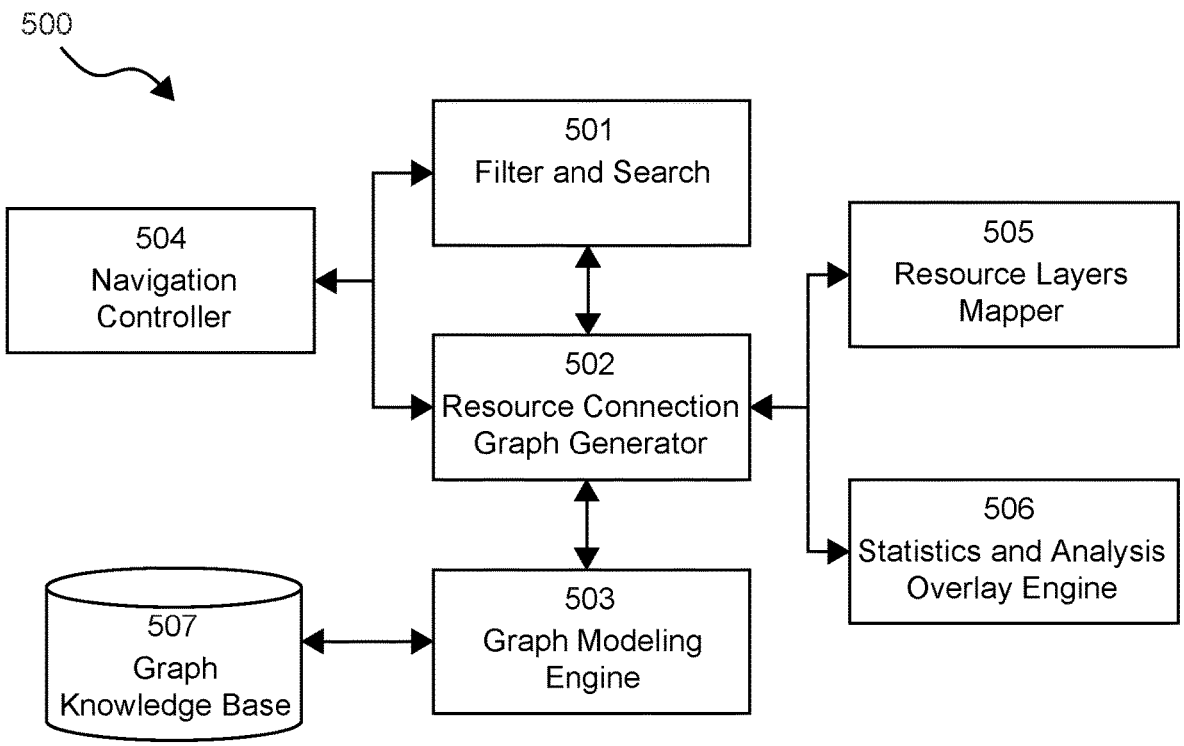
FIG. 5 is a schematic of the visualization engine for cloud instances.

FIG. 5 is a schematic of the visualization engine for cloud instances.

Resource Connection Graph Generator 502 uses Graph Modeling Engine 503 to generate visualization graphs from the graph knowledge base 507. In a preferred embodiment, the visualization graphs are generated as 3D objects. The Graph Knowledge Base 507 contains information on cloud metadata and cloud resources. In exemplary embodiments, Graph Knowledge Base 507 is updated to include and maintain information on each customer, user, and account utilizing the system. The Graph Modeling Engine 503 can create these visualization graphs and store them in the Graph Knowledge Base 507. In preferred embodiments, Graph Modeling Engine 503 can access the Graph Knowledge Base 507, and deliver visualization graphs to the Resource Connection Graph Generator 502.

Navigation Controller 504 enables user navigation through the visualization graphs, generated by Graph Modeling Engine 503, via user navigation devices. A user navigation devices can include a mouse, a keyboard, a joystick, a virtual reality (VR) display, an augmented reality (AR) display, or any physical user interface. In exemplary embodiments, users can access the system through the Navigation Controller 504 in order to visually navigate through the cloud resources displayed in a 3D digital environment. Users can interface with Navigation Controller 504 in order to search and filter cloud resources via the Filter and Search module 501.

The Resource Connection Graph Generator 502 uses information from Resource Layer Mapper 505 to generate additions to visualization graphs by displaying new objects or overlays representing new layers on a visualization graph. In a preferred embodiment, Resource Layer Mapper 505 can map parts of the visualization graph in different colors, shapes, and text to signify these additions to the graph. Resource Connection Graph Generator 502 also uses Statistics Analysis Overlay Engine 506 to accept information from external data sources. In certain embodiments, data from external data sources can be in the form of text, graphics, charts, graphs or images. In one embodiment, data from external data sources can be external networks, business intelligence, or reports from an artificial intelligence system. In an exemplary embodiment, Statistics Analysis Overlay Engine 506 overlays its data in conjunction with a visualization graph, so as to create additional dimensions of information to be visible to the user. Statistics Analysis Overlay Engine 506 can be used to bring in data from other systems to overlay in conjunction with cloud information managed by Connection Graph Generator 502.

Figure 6:
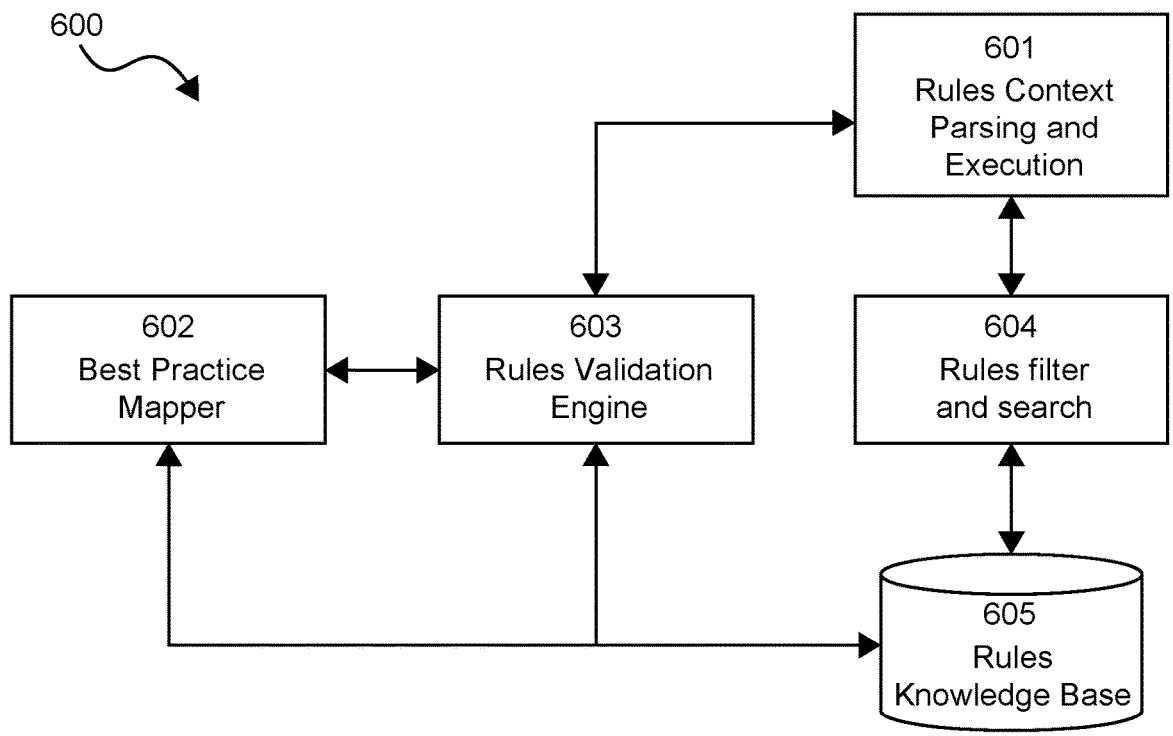
FIG. 6 is a schematic of Rules Engine 600 as used in conjunction with visualization graph generation and action planning for cloud instances.

FIG. 6 is a schematic of Rules Engine 600 as used in conjunction with visualization graph generation and action planning for cloud instances.

The Rules Engine 600 comprises Rules Context Parsing and Execution Module 601, Best Practice Mapper 602, Rules Validation Engine 603, Search and Filters Module 604, and Rules Knowledge Base 605. In exemplary embodiments, rules included in Rules Knowledge Base 605 can be added or deleted via the Search and Filters Module 604. Rules Validation Engine 603 inspects the rules from Rules Knowledge Base 605 for their context when a rule execution command is received from the Rules Context Parsing and Execution Module 601. In a preferred embodiment, Rules Context Parsing and Execution Module 601 can execute and validate rules simultaneously in conjunction with Rules Validation Engine 603. Best Practice Mapper 602 generates and stores groups of rules denoted as Best Practices. A group of rules can be by denoted as Best Practices by the system or by a user command. In a preferred embodiment, Best Practice Mapper 602 interfaces with Rules Validation Engine 603 during rule inspection, and Rules Validation Engine checks for Best Practices from Mapper 602 based on command requests from Module 601. In exemplary embodiment, rules included in Rules Knowledge Base 605 can be validated for consistency, and modified based on discrepancies encountered by the Rules Validation Engine 603.

Figure 7:
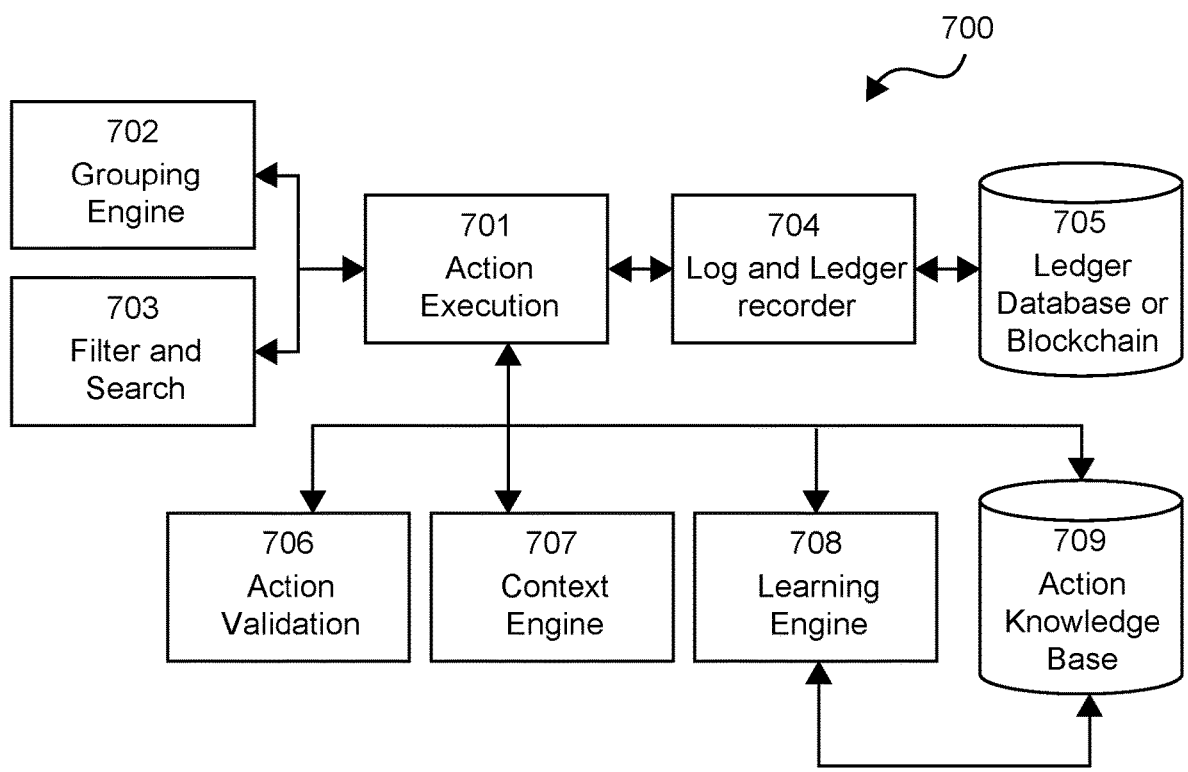
FIG. 7 shows a schematic of the Action Execution Engine 700 engine as used in conjunction with visualization graph generation and action planning for cloud instances.

FIG. 7 is a schematic of the Action Execution Engine 700 engine as used in conjunction with visualization graph generation and action planning for cloud instances.

Action Execution module 701 executes all actions in a cloud instance, including data modification, deletion, and generation. Each action taken by Action Execution module 701 is tracked and logged by Log and Ledger Recorder 704, and is stored in a ledger. In a preferred embodiment, the ledger is immutable, such as in a Blockchain framework or any cryptographic hash-based transaction ledger. In related embodiment, the ledger is mutable, such as in a traditional computer database.

In exemplary embodiments, the user, or system, can execute filtering and searching mechanisms commands via the Filter and Search Module 703. Grouping Engine 702 can group past actions into combined action groups, or generate combined action groups based on a cloud instance. All actions are validated by Action Validation Module 706 before the actions are performed. In preferred embodiment, valediction of the actions is executed in conjunction with Context Engine 707, validating actions based on the context of the cloud instance and past actions. The Learning Engine 708 analyzes actions that are performed in the cloud instance, and updates the validation rules stored in Action Knowledge base 709.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C... and N, the text should be interpreted as requiring only one element from the group, not A plus N, or B plus N, etc.

What is claimed is:

1. A method for configuring workloads, comprising:
identifying cloud resources of an application and a set of cloud resource characteristics for each of the identified cloud resources;
creating a grouping of the cloud resources in reference to a cloud resource characteristic;
assigning the created grouping of the cloud resources to a workload as a function of the cloud resource characteristic of the cloud resources group;
constructing a plurality of workload assignment maps to assign to each of the workloads in accordance with the characteristic of the cloud resources group;
generating a cloud visualization of at least one of the plurality of workload assignment maps.

2. The method of claim 1, wherein the set of cloud resources is at least one of a software component, a software dependency, a hardware dependency, and an application environment context.

3. The method of claim 1, wherein the characteristic of the cloud resources group is at least one of a hardware characteristic, a software characteristic, and a network characteristic.

4. The method of claim 1, wherein the cloud visualization is generated as a function of a network connection between a cloud resource and a workload.

5. The method of claim 1, wherein the step of creating a grouping of the cloud resources is agnostic with respect to a network connection between a cloud resource and a workload.

6. The method of claim 1, further comprising ranking each one of plurality of workload assignment maps based on a set of rules.

7. The method of claim 6, wherein the set of rules comprise a permutation desirability metric for a workload assignment map, a user cost metric, a user efficiency metric, a security metric and a scalability metric.

8. The method of claim 2, wherein the application environment context further comprises at least one of cloud logic and cloud metadata.

9. A system for configuring workloads, comprising:
a scanning engine configured to identify cloud resources of a non-tenant-aware application and a set of cloud resource characteristics for each of the identified cloud resources;
a grouping engine configured to group the cloud resources in reference to a cloud resource characteristic;
a mapping engine configured to assign the created grouping of the cloud resources to a workload as a function of the cloud resource characteristic of the cloud resources group; and
a rendering engine that constructs a plurality of workload assignment maps to assign to each of the workloads in accordance with the characteristic of the cloud resources group;
wherein the scanning engine, the grouping engine, the mapping engine, and the rendering engine comprise stored program instructions embedded in a non-transitory computer readable storage medium, and
wherein the stored program instructions are executed by a computer processor to execute a function.

10. The system of claim 9, wherein the set of cloud resources is at least one of a software component, a software dependency, a hardware dependency, and an application environment context.

11. The system of claim 9, wherein the characteristic of the cloud resources group is at least one of a hardware characteristic, a software characteristic, and a network characteristic.

12. The system of claim 9, wherein a network characteristic is generated as a function of a network connection between a cloud resource and a workload.

13. The system of claim 9, the grouping of the cloud resources is agnostic with respect to a network connection between a cloud resource and a workload.

14. The system of claim 9 further comprising an analysis engine configured to rank each one of the plurality of workload assignment maps based on a set of rule; and
wherein the analysis engine comprises stored program instructions embedded in the non-transitory computer readable storage medium.

15. The system of claim 14, wherein the set of rules comprise a permutation desirability metric for a workload assignment map, a user cost metric, a user efficiency metric, a security metric and a scalability metric.

16. The system of claim 9, further comprising an application environment context; and
wherein the application environment context further comprises at least one of cloud logic and cloud metadata.

* * * * *